(12) United States Patent
Takagi

(10) Patent No.: US 6,749,171 B2
(45) Date of Patent: Jun. 15, 2004

(54) RUSTICATION

(75) Inventor: Kyozaburo Takagi, Centerville, OH (US)

(73) Assignee: Fukuvi USA, Inc., Huber Heights, OH (US)

( * ) Notice: Subject to any disclaimer, the term of this patent is extended or adjusted under 35 U.S.C. 154(b) by 249 days.

(21) Appl. No.: 10/005,195

(22) Filed: Dec. 4, 2001

(65) Prior Publication Data

US 2003/0189268 A2 Oct. 9, 2003

Related U.S. Application Data

(60) Provisional application No. 60/309,930, filed on Aug. 3, 2001.

(51) Int. Cl.$^7$ ................................................ B28B 7/16
(52) U.S. Cl. ...................... 249/134; 249/35; 249/177; 249/187.1
(58) Field of Search .......................... 249/35, 134, 177, 249/187.1, 189, 205

(56) References Cited

U.S. PATENT DOCUMENTS

| | | | |
|---|---|---|---|
| 3,632,078 A | * | 1/1972 | Dashew ...................... 249/183 |
| 5,397,096 A | | 3/1995 | Nelson |
| 5,956,912 A | | 9/1999 | Carter et al. |
| D428,162 S | | 7/2000 | Eyring et al. |
| 6,082,074 A | * | 7/2000 | Shaw et al. ............... 52/742.14 |
| 6,279,868 B1 | | 8/2001 | Eyring et al. |

* cited by examiner

*Primary Examiner*—Robert Davis
*Assistant Examiner*—Donald Heckenberg
(74) *Attorney, Agent, or Firm*—Dinsmore & Shohl LLP

(57) ABSTRACT

A rustication for preparing reveal bands in a precast panel surface. The rustication is made from a one piece elongate body of extruded foam and comprises an upper surface, a lower surface and laterally-spaced sidewall surfaces that extend between the upper and lower surfaces. The lower surface defines a base plane. One or more downward-extending edges that project below the lower surface base plane are included such that they can bend under the application of a load, such as when concrete is poured around it to form the precast panel. Under such a load, the edge scrapes along the top of a panel-forming surface so that an enhanced sealing engagement between the panel-forming surface and the rustication is effected. The rustication can further include a plurality of longitudinally-spaced apertures that extend from the upper surface to the lower surface to facilitate the securing of the rustication to the panel-forming surface, thereby precluding rustication shift once the concrete is poured.

13 Claims, 4 Drawing Sheets

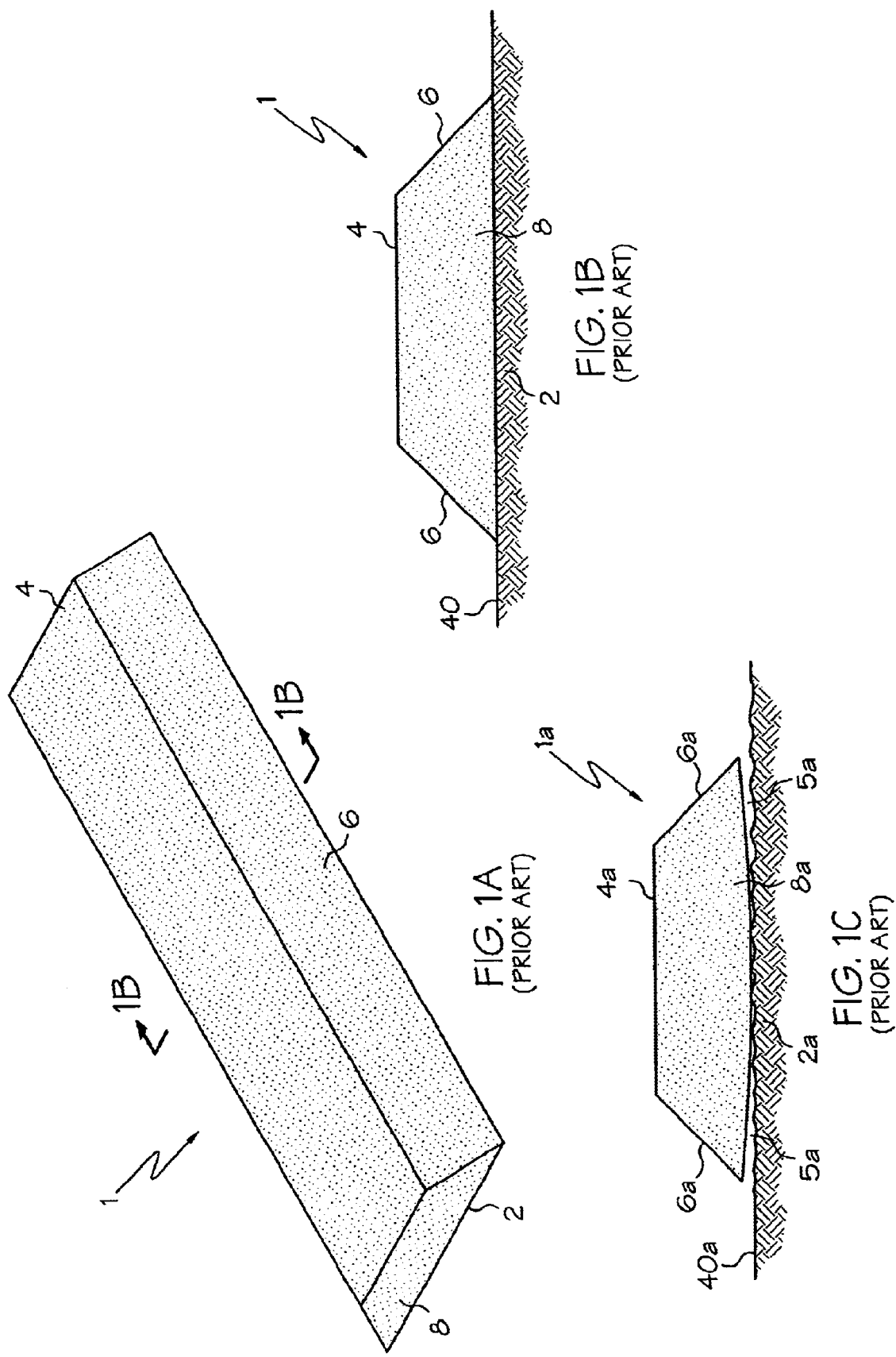

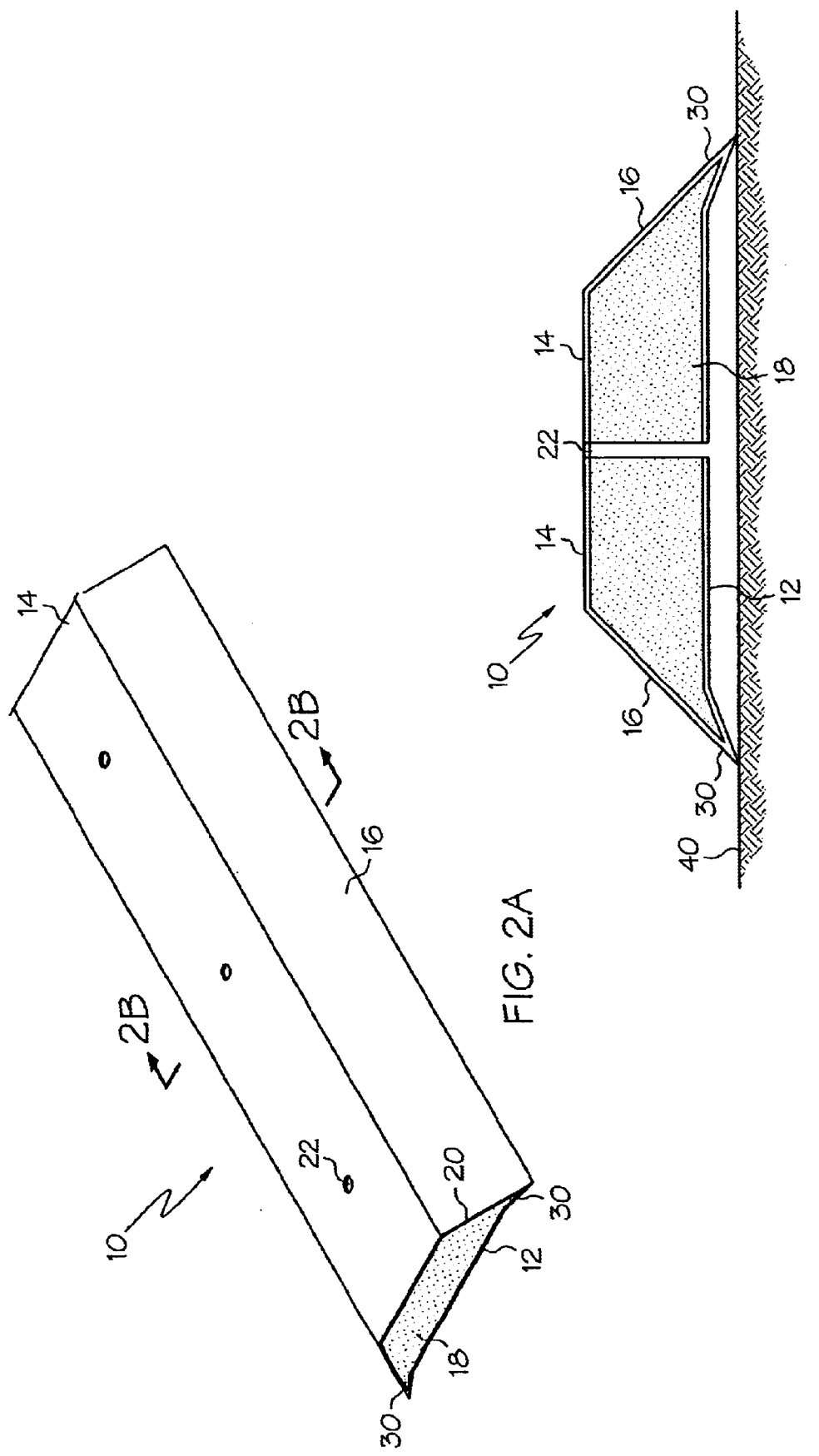

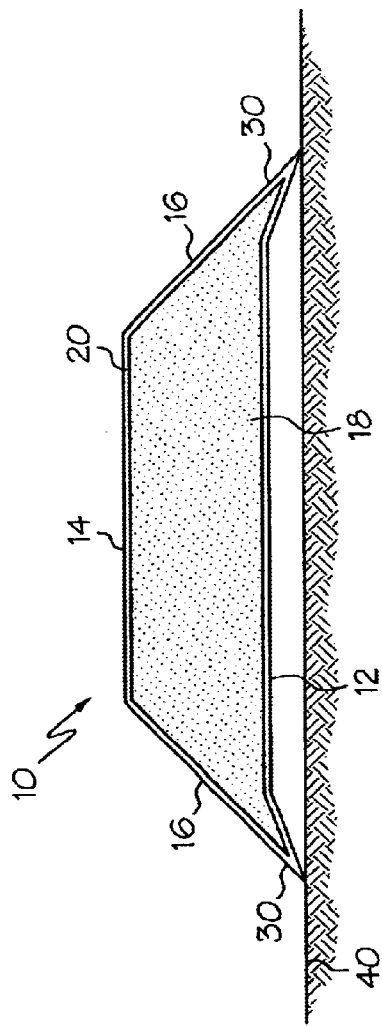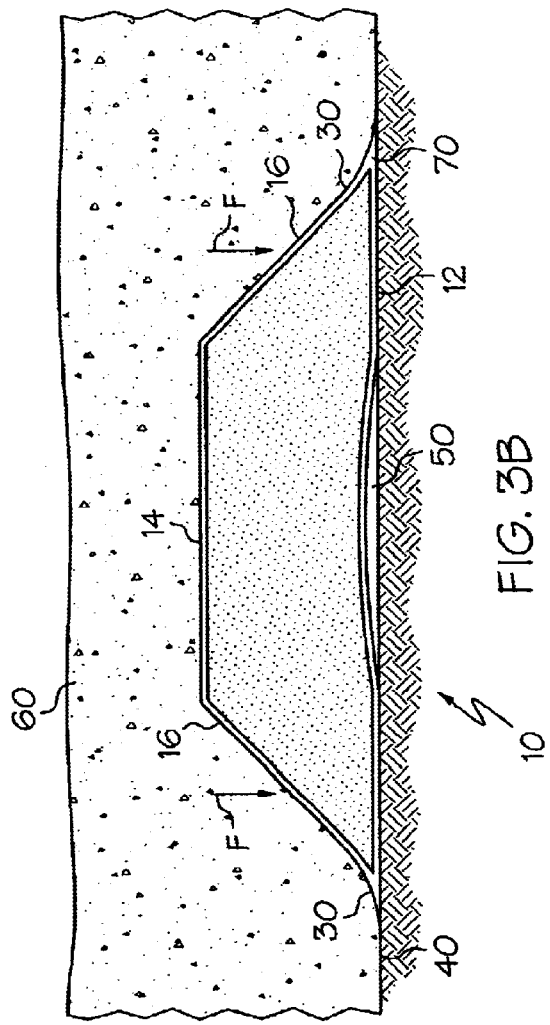

RUSTICATION

BACKGROUND OF THE INVENTION

The present invention relates generally to a rustication for providing reveal bands in concrete and related precast structural members, and more particularly to an inexpensive, onepiece, reusable rustication made from extruded foam that exhibits improved sealing with a casting surface.

Tiltup (or precast) construction of concrete wall sections is wellknown in the art. In such an approach, forms are placed on a flat casting surface and filled with concrete, which is then cured. Once the concrete has set, the form is removed and the wall or panel is tilted up into a preferred, typically vertical, orientation. In some instances, the casting surface is coated with a release agent to facilitate easy separation between it and the panel. Additional structural reinforcements, such as rebar, can be placed within the form prior to pouring the concrete. Architectural features, such as decorative bands, can also be cast into the panel by including one or more formed rustications adjacent the casting surface. Prior art rustications have been made from wood, plastic or metal, where the plastic and metal parts have been preferred in part due to relatively inexpensive, highly automated extrusion processes, where parts can be formed and easily cut into a desired length.

Unfortunately, cost and manufacturing difficulties persist, notwithstanding the improvements made possible by extruded metal or plastic rustications. To obtain the proper balance of weight and strength, the prior art has had to adopt complex structural schemes, with a concomitant adverse impact on cost. Moreover, prior art rustication still exhibits performance limitations. For example, the tendency of the poured concrete to leak into gaps between the rustication and the casting surface prior to drying and hardening is problematic in that the resulting dried concrete portion that has leaked through can stick to the rustication, which can in turn lead to increased cleanup time and cost. Also, stray pieces of cured concrete, if adhered to the finished panel, can adversely effect its quality. In addition, adhesion between the panel and the rustication can cause the latter to become damaged when a worker attempts to separate the two, thus resulting in an unintended, cost-prohibitive one-time rustication use. Accordingly, the dimensionality of the engaging surfaces between the prior art rustication and casting surface is critical to avoid these gaps. This, in turn, necessitates closer tolerances to ensure surface uniformity, which increases cost.

Accordingly, there exists a need for a rustication device that is inexpensive to manufacture and simple to use. An additional need exists for a rustication that can ensure that tiltup wall panels are precast with a minimum amount of poured concrete seepage or bleed-through, thereby avoiding concrete-chamfer bonding upon curing of the concrete.

SUMMARY OF THE INVENTION

The need is met by the present invention, which comprises a rustication used to provide reveal bands in precast and related tiltup wall panels without the disadvantages of the prior art. According to a first embodiment of the present invention, a rustication for preparing reveal bands in the surface of a precast panel is disclosed. The rustication is made from a one piece elongate body of extruded foam, and includes an upper surface, a lower surface and laterally-spaced sidewall surfaces that extend between the upper and lower surfaces to join the two. The lower surface defines a base plane. At least one downward-extending edge extends from the lower surface corner of the rustication base plane. Each edge projects beyond the lower surface such that the majority of the base plane defined by the lower surface would not contact a generally planar panel forming surface absent the application of a downward-acting external load. The cantilever nature of the edge allows it to be flexible enough to deflect under the application of a load, such as when concrete is poured around it to form the precast panel. Under such a load, the edge splays, thus scraping along the top of the panel forming surface so that an enhanced sealing engagement between the panel forming surface and the rustication is effected. In addition, depending on the load, other portions of the lower surface of the rustication can come in contact with the panel forming surface, thereby improving contact between the rustication and the panel forming surface. The outer surface of the rustication body is preferably made up of a skin that is substantially nonporous relative to the core of the body. While to some extent such a nonporous skin can be a natural concomitant to conventional extrusion processes, it is also possible to control skin properties with appropriate extrusion parameters. Please note, however, that details relating to the skin (including its relative density, thickness and method of formation) is not the subject of the present invention. As used in the present disclosure, an outer surface (alternately referred to as an outward-facing surface) of the rustication is any surface that is facing or can be placed in direct contact with the panel forming surface, poured concrete or related precast material. Also as used in conjunction with the present disclosure, the term "substantially" refers to an arrangement of elements or features that, while in theory would be expected to exhibit exact correspondence or behavior, may, in practice embody something slightly less than exact For example, in the present context, even if a surface or element did not possess precisely the desired quality, by being "substantially" of that quality, its approximation to such quality would be encompassed under the present definition. For example, the edges, while in a preferable configuration are substantially coplanar with the outer surface of the sidewall surfaces, could have a built-in upward concavity or more vertical-projecting normal surface relative to the sidewall surface to improved scaling. In the context of the present invention, a foam piece is to be distinguished over other extruded materials in that it intentionally includes porosity throughout a majority of its structure, whereas most conventional extruded materials (for example, metals and plastics) are either porosity-free or include only residual porosity. It is precisely the advantageous structural, weight, cost and formability properties made possible by the present rustication's exploitation of foam that renders the benefits described herein.

According to another embodiment of the invention, a rustication for preparing reveal bands in the surface of a precast panel is disclosed. The rustication is made from a one piece elongate body defined by a core section of extruded foam and an outer section. As with the previous embodiment, the outer surface of the rustication body can include a skin that is substantially nonporous relative to the core section. The outer section of the body includes an upper surface, a lower surface defining a base plane and a pair of laterally-spaced sidewall surfaces that each terminate on their respective lower portion with an integral, downward-extending edge. The outward-facing surface of the edge, which is configured to be exposed to poured precast material, is substantially coplanar with the outer surface of the sidewall surface from which it extends. In the present context, an upward-facing surface can include any surface that has a normal projection therefrom that has a Cartesian component thereof that points vertically up. Thus, for example, the sidewall surfaces of a trapezoidal member, although not facing purely vertical, would be "upward-facing". The lower surface is coupled to the upward-facing surface(s), and is configured to have at least a portion thereof engaging a panel-forming surface. The present embodiment can incorporate features similar to that of the previous embodiment.

According to still another embodiment of the invention, a rustication for preparing reveal bands in the surface of a precast panel is disclosed. The rustication is made up of a one piece elongate body of extruded foam, and includes a core section and an outer section. The outer section comprises at least one upward-facing surface, a lower surface defining a base plane with the lower surface coupled to the upward-facing surface, and at least one downward-extending edge that projects below the base plane. Upon formation of the precast panel, the rustication exhibits enhanced sealing engagement with the panel-forming surface, due in part to the one or more downward-extending edges configured to engage a panel forming surface. Preferably, although not necessarily, the present embodiment rustication is triangular-shaped, where the at least one upward-facing surface could be two surfaces that form the upstanding legs of the triangle, with the lower surface forming the triangle base. In addition, the triangle shape can take on numerous forms, depending on the application, including acute, right or obtuse angles at the apex. As with the previous embodiment, the outer section of the rustication body can include a skin that is substantially nonporous relative to the core section.

According to yet another embodiment of the invention, a method of manufacturing a precast panel with a reveal band formed therein is disclosed. The method includes configuring a rustication to include a one piece elongate body of extruded foam, placing the rustication on a panel forming surface, pouring uncured precast material (such as concrete) around the rustication, curing (hardening) the precast material, and removing the rustication from the precast panel. The rustication includes an upper surface, a lower surface defining a base plane, laterally-spaced sidewall surfaces that join the upper and lower surfaces, and at least one downward-extending edge that projects below the base plane such that upon formation of the precast panel, the rustication exhibits enhanced sealing engagement with the panel forming surface. Preferably, the downward-extending edge is substantially coplanar with the laterally-spaced sidewall surface from which it extends. The rustication formed by the present method can have an outer skin be substantially nonporous relative to the porous core, similar to that of the previous embodiments. The rustication is configured to rest upon the panel-forming surface in a predetermined location prior to pouring the uncured precast material. Optionally, the method also includes the step of securing the rustication to the panel-forming surface prior to pouring the precast material to ensure that it does not move under the load of the precast material.

According to still another embodiment of the invention, a method of producing a rustication with a one piece elongate body of extruded foam is disclosed. The method includes configuring an extruder to include an output stream defined by a predetermined shape, providing the extruder with a quantity of foamable material, and operating the extruder such that the foamable material is forced through the output stream in such predetermined shape to form the rustication. The predetermined shape of the output stream includes an upper surface, a lower surface and a plurality of laterally-spaced sidewall surfaces that join between the upper and lower surfaces. Optionally, the method includes the additional step of forming a plurality of apertures in the rustication to enable rustication attachment to the panel forming surface. As with previous embodiments, the outer skin of the rustication formed by the present method can be substantially nonporous relative to the porous core. As an additional optional step, the rustication exiting the extruder can be segmented (such as by cutting) into individual pieces of predetermined length.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIG. 1A illustrates a perspective view of a prior art rustication;

FIG. 1B illustrates a cutaway view taken along line 1B—1B of FIG. 1A;

FIG. 1C illustrates a cut-away view of the rustication of FIG. 1B placed on an uneven surface.

p FIG. 2A illustrates a perspective view of a rustication according to an embodiment of the present invention;

FIG. 2B illustrates a cutaway view taken along line 2B—2B of FIG. 2A;

FIG. 3A illustrates an end view of the embodiment prior to application of a load;

FIG. 3B illustrates the embodiment of FIG. 2 under a poured concrete load; and

DETAILED DESCRIPTION OF THE PREFERRED EMBODIMENTS

Figure 4:
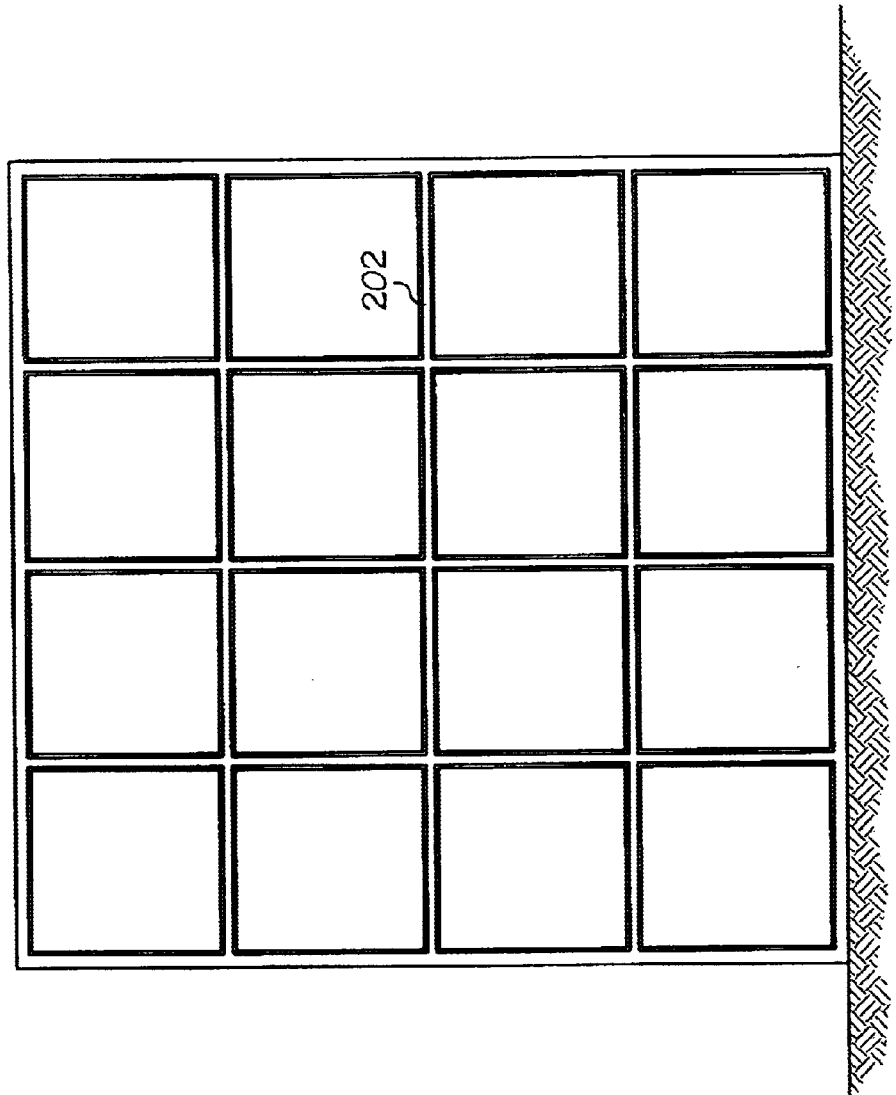
FIG. 4 illustrates a precast concrete wall with periodic reveal bands formed by a rustication according to the present invention.

Referring initially to FIGS. 1A through 1C, a conventional rustication 1 of the prior art is shown. The rustication 1 includes a lower surface 2, an upper surface 4 and a pair of laterally-spaced sidewall surfaces 6. The structure of the rustication 1 is defined by a core 8 possessing varying degrees of rigidity. Referring with particularity to FIG. 1B, the lower surface 2 is shown with a generally planar lower surface 2 such that it can rest on a planar panel-forming surface 40 (which is typically in the form of a smooth floor, and is alternatively referred to as a slab or casting surface). The lower surface 2 of the rustication 1 and the panel-forming surface 40 both include bumps, rough spots, and other irregularities or undulations. For example, as shown with particularity in FIG. 1C, these irregularities in the lower surface 2 of the rustication 1 can cause the lower surface 2a of the rustication 1a to only partially contact the panel-forming surface 40a. Upon casting, this can lead to excessive leakage of uncured concrete (not presently shown) into interstitial spaces 5a. As previously discussed, such leakage is detrimental to the quality of the finished cast panel product, the long-term viability of the rustication and clean-up and related post-casting costs.

Referring now to FIGS. 2A and 2B, a rustication 10 according to the present invention is illustrated. According to the present invention, the rustication 10 is provided including a lower surface 12, an upper surface 14, and a pair of laterally-spaced sidewall surfaces 16, each with beveled outer surfaces used to define a complimentary bevel, or chamfer, surface on a precast concrete panel. Edges 30 extend from the lower end of the beveled sidewall surfaces 16, and join with the base plane of lower surface 12 such that rustication 10 takes on a modified trapezoidal structure. The extension of the edges 30 below the base plane formed by the lower surface 12 results in a rustication 10 that is more amenable to surface undulations than that of the prior art configuration shown in FIG. 1C, as the inherent flexibility and limited amount of contact surface permit more unevenness in the extrusion process. Specifically, the additional space provided between the rustication 10 and the slab upon which it rests allows for significant variations or irregularities in the lower surface of the rustication 10 and accounts for inevitable unevenness in the extrusion process. This has additional benefits in the manufacture of such rustications, as tolerances on surface planarity can be relaxed, reducing cost. With such reduced tolerance requirements, the extrusion process, which can yield generally elongate parts with a user-defined length, is amenable to the simple, low cost fabrication strategy of the present invention. The finished rustication part comes out of the extruder without requiring subsequent machining, processing or surface finishing, and can be easily cut to user-defined lengths, then shipped or stored.

While the edges 30 are preferably coplanar with the outward-facing portion of sidewall surfaces 16, they need not be. For example, the edges 30 could have a built-in upward concavity or more vertical-projecting normal surface relative to the sidewall surface 16 (neither configuration presently shown) to promote lateral splaying and attendant improved sealing. The upper and lower surfaces 14 and 12, respectively, meet the corresponding ends of the sidewall surfaces 16 to define corners that can form acute, right or obtuse angles, depending on the desired architectural features.

As shown with particularity in FIG. 2B, apertures 22 can be spaced periodically along the longitudinal axis of rustication 10. These apertures extend all the way from the upper surface 14 to the lower surface 12, and can be sized to accommodate a conventional fastener (not shown) to secure the rustication 10 to a panel-forming surface 40. It is to be noted that rustication 10 need not rely on apertures 22 disposed therein for securing it to the surface 40; for example, conventional adhesives, such as glue or double-faced tape (neither of which are shown) could be used.

While the rustication shown in the present embodiment is of a generally trapezoidal shape, it will be appreciated by those of ordinary skill in the art that the ambit of the present invention is not so limited, as the rustication could take on numerous other conventional shapes, depending on the architectural or decorative need. For example, it could be triangular-shaped, which is effectively a degenerate trapezoid, where the laterally-spaced sidewalls 16 and the upper surface 14 merge into two upstanding leg portions (not shown). Such a triangular-shaped device could still be fitted with many of the same optional features, such as the downward-extending edges, apertures and porous core section presently shown.

The rustication 10 is a one-piece member that, as previously mentioned, can be made from extruded foam, thus revealing a porous core 18, or internal structure. Preferably, during the extrusion process, a smooth, sealed outer skin 20 is formed that covers at least the upper and bevelled sidewall surfaces 12 and 16, respectively. The skin 20 is relatively nonporous compared to that of porous core 18 such that it is substantially impenetrable to water and related liquids inherent in poured concrete. The presence of the relatively nonporous outer skin 20 is beneficial in that it effects improved release properties upon concrete curing relative to a porous surface. As indicated earlier, though, the outer skin 20 (and details related thereto) is not the subject of the present invention. To further reduce cost and weight, while still providing the requisite structural rigidity and resistance to warping, the foamed material can be polystyrene, polyvinyl chloride (PVC), acrylonitrile-butadiene-styrene (ABS) or related material. The foam can be either closed cell (where the majority of the cells are non-interconnecting), open cell (where many of the cells do interconnect), syntactic (where rigid microspheres are dispersed in a fluid polymer, then cured) or other conventional foamed structure. The nonporous outer skin 20 can be an additional contributor to overall rustication rigidity. In the present context, the skin 20 is formed from the same foamed material as that of porous core 18, with a higher density to promote the formation of the aforementioned liquid-resistant surface properties due to its relatively nonporous, shell-like configuration.

FIGS. 3A and 3B illustrate the use of rustication 10 in a concrete casting operation. The inherent compliance of the edges 30 ensures that a generally downward-projecting load will force the edges 30 to laterally scrape along the panel-forming surface 40, thus minimizing the amount of concrete (or similar casting material) that can seep in underneath rustication 10. The continuous nature of the rustication's one-piece construction further ensures that when subjected to a load, the entire surface responds to promote an even, complete sealing between rustication 10 and panel-forming surface 40. FIG. 3B illustrates this effect when rustication 10 is subjected to a load due to poured concrete 60. The downward-acting force F due to the weight of the concrete 60 acts to push down on the upper and bevelled sidewall surfaces, 14 and 16 respectively, which in turn translates the downward force to the edges 30. The presence of the rigid panel-forming surface 40 prevents vertical motion of the edges 30, which then tend to splay in a laterally outward direction to form a seal 70. The lower surface 12 of rustication 10 is similarly forced downward; however, the unsupported portion of the lower surface 12 moves downward in response to the load until it too forms a contact with the panel-forming surface 40, thus leaving a smaller gap 50 and increasing the size of seal 70, thereby preventing the poured concrete 60 from seeping through and becoming wedged between the rustication 10 and the panel-forming surface 40. This seal 70 promotes long-life, reusable rustications, as the opportunity for the formation of cured/hardened concrete on the rustication surfaces is reduced.

FIG. 3B further illustrates that the sealing edges 30 and the corresponding gap 50 between the lower surface 12 of the rustication 10 and the panel forming surface 40 may be provided by defining a concave portion in the lower surface 12 of the rustication 10. It is noted that the relative extent of the concave portion is illustrated in a reduced length in FIG. 3B because of the deformation imparted to the rustication 10 by the load of the concrete 60, as discussed above. It is further noted that, as is illustrated in FIGS. 3A and 3B, the sealing edges 30 define a sealing edge plane extending there between that extends along the plane of the panel forming surface 40. Accordingly, the rustications illustrated in FIGS. 3A and 3B may be described as defining a gap between the lower surface 12 and the sealing edge plane.

FIG. 4 illustrates a finished precast panel 200 that includes reveal bands 202 formed by the rustication of one of the embodiments of the present invention. These bands can provide architectural or structural features to the finished surface. A method of forming such precast panels would include placing the extruded foam rustications of the aforementioned embodiments on a casting surface, securing them to the surface through conventional means, such as tape, screws, nails, rivets or a soluble glue, pouring the concrete into a panel at least partially defined by the rustications, and curing the poured concrete. A method of producing a foamed rustication according to the aforementioned embodiments would include the steps of placing a conventional plastic material (such as polystyrene, ABS, PVC or the like) into an extruder, configuring a preferred net shape (such as a trapezoid or triangle) in the extruder discharge (also referred to as an output stream), and extruding the material through the extruder discharge such that a rustication with a porous internal core and smooth, substantially liquid-impenetrable outer surface is formed. Optionally, the extruded rustication can be segmented into user-defined lengths through cutting or batch processing of a finite quantity of polymer precursor. In addition, the rustication produced by the present extrusion process may include the edges used to define the seals.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A rustication for preparing reveal bands in the surface of a precast panel, said rustication defined by a one piece elongate body of extruded foam, said body comprising:
   an upper surface;
   a lower surface defining a base plane at least a portion of which is configured to engage a panel-forming surface;
   a pair of laterally-spaced sidewall surfaces that join said upper and lower surfaces; and
   at least one downward-extending edge that projects below said base plane such that upon formation of said precast panel, said rustication exhibits enhanced sealing engagement with said panel forming surface.

2. A rustication according to claim 1, wherein said body has a substantially trapezoidal-shaped cross section.

3. A rustication according to claim 1, wherein said at least one downward-extending edge is configured such that a downward force exerted upon at least one of said upper or sidewall surfaces when said rustication is engaged with said panel forming surface tends to splay said at least one edge along said panel-forming surface.

4. A rustication according to claim 1, wherein each said laterally-spaced sidewall surface includes a corresponding one of said at least one downward-extending edge disposed at a lower end thereof.

5. A rustication according to claim 4, wherein said corresponding one of said at least one downward-extending edge and said laterally-spaced sidewall surface are substantially coplanar with one another.

6. A rustication according to claim 1, wherein said body further includes a plurality of longitudinally-spaced apertures that extend from said upper surface to said lower surface to facilitate the securing of said rustication to said panel forming surface.

7. A rustication for preparing reveal bands in the surface of a precast panel, said rustication configured to effect enhanced sealing engagement with a panel-forming surface when formation of said precast panel, said rustication defined by a one piece elongate body of extruded foam, said body comprising:
   an upper surface;
   a lower surface defining a base plane at least a portion of which is configured to engage said panel-forming surface; and
   a pair of laterally-spaced sidewall surfaces that join said upper and lower surfaces, each said laterally-spaced sidewall surface including a downward-extending edge that is substantially coplanar with the outward-facing surface of said sidewall surface, said downward-extending edge configured such that a downward force exerted upon said upper surface or said sidewall surfaces when said rustication is engaged with said panel-forming surface tends to splay said downward-extending edge along said panel-forming surface.

8. A rustication for preparing reveal bands in the surface of a precast panel, said rustication defined by a one piece elongate body of extruded foam with a core section and an outer section, said outer section comprising:
   at least one upward-facing surface;
   a lower surface coupled to said at least one upward-facing surface, said lower surface defining a base plane at least a portion of which is configured to engage a panel-forming surface; and
   at least one downward-extending edge that projects below said base plane such that upon formation of said precast panel, said rustication exhibits enhanced sealing engagement with said panel-forming surface.

9. A rustication according to claim 8, wherein said at least one downward-extending edge is configured such that a downward force exerted upon said at least one upward-facing surface when said rustication is engaged with said panel-forming surface tends to splay said edge along said panel-forming surface.

10. A rustication according to claim 8, wherein each said at least one upward-facing surface includes a corresponding one of said at least one downward-extending edge disposed at a lower end thereof.

11. A rustication according to claim 10, wherein said corresponding one of said at least one downward-extending edge and said at least one upward-facing surface are substantially coplanar with one another.

12. A rustication according to claim 10, wherein said rustication is triangular shaped.

13. An elongate body of extruded foam, said body defining an upper surface, a lower surface comprising a concave portion, and a pair of laterally-spaced sidewall surfaces extending between said upper and lower surfaces, wherein:
   each of said laterally-spaced sidewall surfaces terminates at a downward-extending edge defined by said concave portion of said lower surface;
   said respective downward-extending edges define a sealing edge plane; and
   said respective downward-extending edge and said concave portion of said lower surface define a gap between said lower surface and said sealing edge plane.

* * * * *

UNITED STATES PATENT AND TRADEMARK OFFICE
CERTIFICATE OF CORRECTION

PATENT NO. : 6,749,171 B2
DATED : June 15, 2004
INVENTOR(S) : Takagi

It is certified that error appears in the above-identified patent and that said Letters Patent is hereby corrected as shown below:

Column 1,
Line 10, "Tiltup" should read -- Tilt-up --
Line 39, "cleanup" should read -- clean-up --
Line 53 and 60, "tiltup" should read -- tilt-up --

Column 2,
Line 43, "scaling" should read -- sealing --

Signed and Sealed this

Twenty-first Day of December, 2004

JON W. DUDAS
*Director of the United States Patent and Trademark Office*